(12) United States Patent
Thodal et al.

(10) Patent No.: US 12,377,976 B2
(45) Date of Patent: Aug. 5, 2025

(54) ROTOR ASSEMBLY DEPLOYMENT MECHANISM AND AIRCRAFT USING SAME

(71) Applicant: Joby Aero, Inc., Santa Cruz, CA (US)

(72) Inventors: Robert Thodal, Santa Cruz, CA (US); Florian Jule, Santa Cruz, CA (US); Baixi Pei, Newark, CA (US); Joachim Grenestedt, Hellertown, PA (US); Jordin Gischler, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 18/749,624

(22) Filed: Jun. 21, 2024

(65) Prior Publication Data
US 2025/0002145 A1    Jan. 2, 2025

Related U.S. Application Data

(60) Provisional application No. 63/523,795, filed on Jun. 28, 2023.

(51) Int. Cl.
  *B64C 29/00* (2006.01)
(52) U.S. Cl.
  CPC .................. *B64C 29/0033* (2013.01)

(58) Field of Classification Search
CPC . B64C 29/0033; B64C 29/0075; B64C 27/52; B64U 30/297
See application file for complete search history.

(56) References Cited

U.S. PATENT DOCUMENTS

| | | | |
|---|---|---|---|
| 2016/0031556 A1* | 2/2016 | Bevirt ..................... | B64C 11/10 416/131 |
| 2020/0331602 A1* | 10/2020 | Mikic ..................... | B64C 13/16 |
| 2022/0173634 A1* | 6/2022 | Gischler ................ | H02K 7/116 |

* cited by examiner

*Primary Examiner* — Nicholas McFall
*Assistant Examiner* — Justin Michael Heston
(74) *Attorney, Agent, or Firm* — Michael A. Guth

(57) ABSTRACT

A rotor assembly deployment mechanism configured to deploy a rotor assembly of a vertical take-off and landing aircraft from a horizontal, forward thrust, position to a vertical, hover, position. The rotor assembly deployment mechanism is configured to deploy an electric motor and propeller together. The deployment mechanism provides significant stiffness and strength with the use of torsion box constructions. The deployment mechanism may utilize bar linkages wherein the primary linkage pivot is of a large diameter relative to the span of the pivot in order to provide significant stiffness. The deployment mechanism may utilize rotary actuators to drive the deployment and stowing of the rotor assembly.

18 Claims, 14 Drawing Sheets

ROTOR ASSEMBLY DEPLOYMENT MECHANISM AND AIRCRAFT USING SAME

CROSS-REFERENCE TO RELATED APPLICATIONS

This application claims priority to U.S. patent application Ser. No. 63/523,795 to Thodal et al., filed Jun. 28, 2023, which is hereby incorporated by reference in its entirety.

FIELD OF THE INVENTION

This invention relates to the aviation field, namely a rotor assembly deployment mechanism used on aerial vehicles.

SUMMARY

Figure 1A:
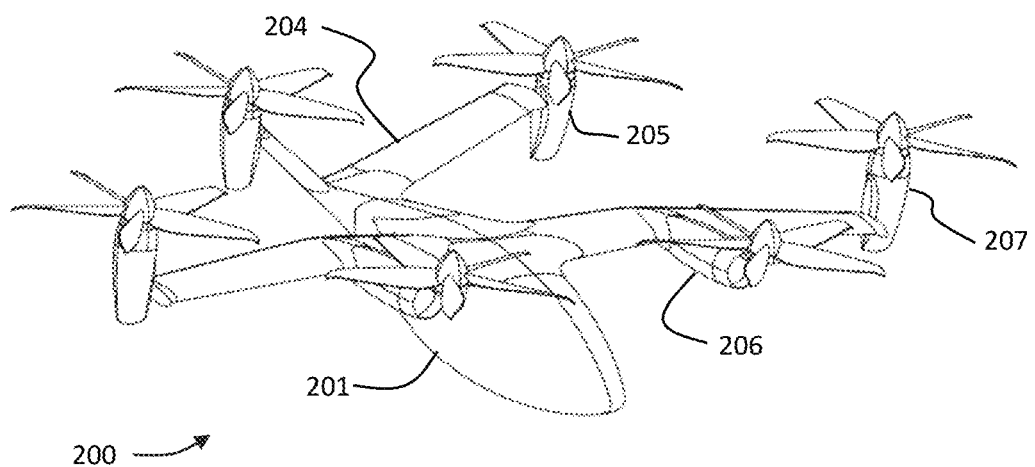
FIG. 1A is a vertical take-off and landing aircraft in a take-off configuration according to some embodiments of the present invention.

A rotor assembly deployment mechanism configured to deploy a rotor assembly of a vertical take-off and landing aircraft from a horizontal, forward thrust, position to a vertical, hover, position. The rotor assembly deployment mechanism is configured to deploy an electric motor and propeller together. The deployment mechanism provides significant stiffness and strength with the use of torsion box constructions. The deployment mechanism may utilize bar linkages wherein the primary linkage pivot is of a large diameter relative to the span of the pivot in order to provide significant stiffness. The deployment mechanism may utilize rotary actuators to drive the deployment and stowing of the rotor assembly.

DETAILED DESCRIPTION

In some embodiments of the present invention, a rotor assembly deployment mechanism provides a compact, stiff, and reliable device adapted to control and alter the thrust angle of a rotor assembly of an aircraft. In some aspects, the rotor assembly deployment mechanism is configured to deploy an electric motor, a propeller hub, a propeller, and a spinner. In some aspects, the electric motor is outboard of the primary mounting plane of the rotor assembly mounting bracket of the rotor assembly deployment mechanism. In some aspects, the rotor assembly deployment mechanism utilizes torsion box construction to lend stiffness the assembly. In some aspects, the primary central pivot is of an enlarged diameter to lend strength and stiffness to the assembly. In some aspects, rotary actuators utilizing harmonic drives are utilized to deploy the rotor assemblies affixes to the rotor assembly deployment mechanism.

In some aspects, a representative aircraft propulsion system includes a rotor assembly, a nacelle, a propeller hub, and a drive motor with an external rotor. The rotor includes a propeller with a set of blades coupled to the propeller hub and may include a cowling, or spinner. The nacelle defines an outer surface. The drive motor includes a rotary portion rigidly coupled to the propeller hub, and a fixed portion coupled to the nacelle, or otherwise to the aircraft structure. The system can include a tilt mechanism housed at least partially in the lumen of the nacelle, a power supply, and any other suitable components. The aircraft propulsion system can be used in conjunction with a rotorcraft. The rotorcraft is preferably a tiltrotor aircraft with a plurality of aircraft propulsion systems (e.g., rotor assemblies, rotor systems, etc.), operable between a forward arrangement and a hover arrangement. The rotorcraft can alternatively be a fixed wing aircraft with one or more rotor assemblies, and/or any other suitable rotorcraft or vehicle propelled by rotors. The rotorcraft preferably includes an all-electric powertrain (e.g., battery or hydrogen fuel cell powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

The term "rotor" as utilized herein, in relation to the aircraft propulsion system or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described. The motor, which may be an electric motor, may also then have a motor rotor. It should be understood that the motor rotor represents a different usage of the term rotor than as discussed above with regard to a rotary aerodynamic actuator.

The rotor functions to rotate in a fluid under the power of the drive mechanism in order to provide thrust (e.g., to an attached aircraft). The rotor includes a set of blades coupled to a hub, and a cowling, or spinner, that at least partially encloses the hub. The set of blades functions to transfer the rotational momentum of the rotor to the fluid, resulting in at least a portion of the fluid having axial momentum (e.g., to provide thrust). The rotor can have any suitable number of blades; the rotor has five blades in an illustrative embodiment, but can alternatively have three blades, four blades, six blades, and any other suitable number of blades. In a specific example, the rotor includes five variable-pitch blades; in alternative examples, the rotor can have any suitable number of blades having variable- or fixed-pitch.

The rotor blades are preferably unconstrained at the blade tips (e.g., by any sort of physical structure), but the rotor can additionally or alternatively include a fairing that encloses the blade tips (e.g., such as the duct of a ducted fan). In such variations, the fairing can function to dampen the acoustic signature components (e.g., acoustic waves) that originate from the blade tips during rotation. However, the rotor blades can additionally or alternatively be constrained or unconstrained in any suitable manner.

The hub functions to mutually couple the set of blades and provide a region at which the rotor couples to the drive mechanism and receives rotary power therefrom. In some aspects, the motor is an outrunner electric motor, and the hub is structurally coupled to a forward surface of the rotor of the electric motor.

The lumen functions to define a volume that retains components of the aircraft propulsion system and/or other aircraft subsystems. Such retained components can include, in variations, at least a portion of a tilt mechanism, all or a portion of the power supply, power delivery subsystems (e.g., electrical power distribution cables, conduits, etc.), mechanical actuators (e.g., for actuating control surfaces of the aircraft), all or a portion of the drive mechanism, and any other suitable components.

In some aspects, an aerial vehicle may use bladed propellers powered by electric motors to provide thrust during take-off. The propeller/motor units may be referred to as rotor assemblies. In some aspects, the motor driven propeller units on the wings may themselves rotate relative to a fixed wing, such that the propellers provide vertical thrust for take-off and landing. The rotation of the motor driven propeller units may allow for directional change of thrust by rotating both the propeller and the electric motor, thus not requiring any gimbaling, or other method, of torque drive around or through a rotating joint.

In some aspects, aerial vehicles according to embodiments of the present invention take off from the ground with vertical thrust from rotor assemblies that have deployed into a vertical configuration. As the aerial vehicle begins to gain altitude, the rotor assemblies may begin to be tilted forward in order to begin forward acceleration. As the aerial vehicle gains forward speed, airflow over the wings results in lift, such that the rotors become unnecessary for maintaining altitude using vertical thrust. Once the aerial vehicle has reached sufficient forward speed, some or all of the blades used for providing vertical thrust during take-off may be stowed along their nacelles. In some aspects, all rotor assemblies used for vertical take-off and landing are also used during forward flight. The nacelle supporting the rotor assemblies may have recesses such that the blades may nest into the recesses, greatly reducing the drag of the disengaged rotor assemblies.

After take-off, the aerial vehicle will begin a transition to forward flight by articulating the rotors from a vertical thrust orientation to a position which includes a horizontal thrust element. As the aerial vehicle begins to move forward with speed, lift will be generated by the wings, thus requiring less vertical thrust form the rotors. As the rotors are articulated further towards the forward flight, horizontal thrust, configuration, the aerial vehicle gains more speed.

The electric motor/propeller combination being on the outboard side of the articulating joint allows for a rigid mounting of the propeller to the motor, which is maintained even as the propeller is moved through various attitudes relative to the rear nacelle portion. With such a configuration the rotating power from the motor need not be gimbaled or otherwise transferred across a rotating joint. The deployment is of the entire motor driven rotor assembly in some aspects. In some aspects, the deployment of the rotor assembly utilizes a linkage, which deploys the rotor assembly to a vertical thrust position while simultaneously pushing it forward and away from the remaining body of the nacelle, and further away from the wing. The push away from the remaining body of the nacelle reduces the download in the wing from the downwash of the associated rotor. In some aspects, the rotor assembly is both pushed forward and raised when deployed to a vertical thrust position from a horizontal thrust, stowed, position.

Figure 1B:
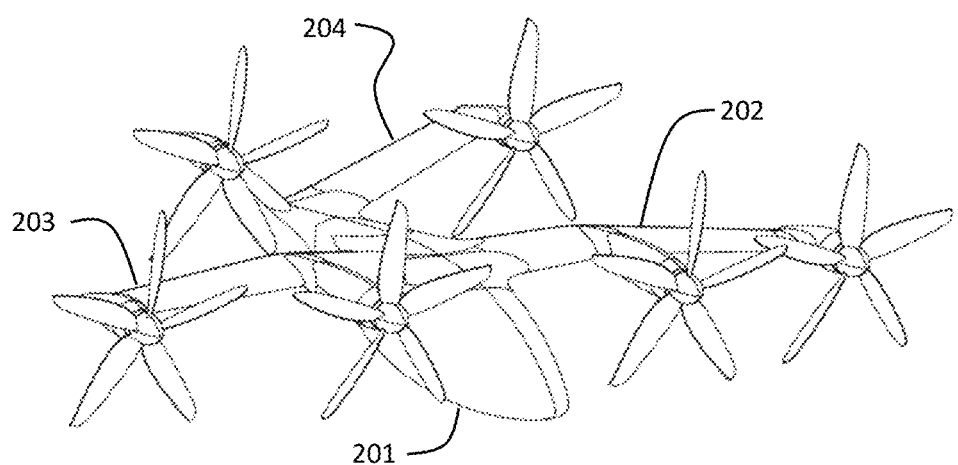
FIG. 1B is a vertical take-off and landing aircraft in a forward flight configuration according to some embodiments of the present invention.

In a first configuration according to some embodiments of the present invention, as seen in a vertical take-off configuration in FIG. 1A and in a forward flight configuration in FIG. 1B, an aerial vehicle 200 uses fixed wings 202, 203, which may be forward swept wings, with rotors of the same or different types adapted for both vertical take-off and landing and for forward flight. In some aspects additional rotors may be present which are fixed in their orientation. The aircraft body 201 supports a left wing 202 and a right wing 203. Motor driven rotor assemblies 206, 207 on the wings include propellers which may stow and nest into the nacelle body. In some embodiments, the propeller blades do not stow and nest into the nacelle body. The aircraft body 201 extends rearward is also attached to raised rear stabilizers 204. The rear stabilizers have rear rotor assemblies 205 attached thereto. Although five or six passenger seats are anticipated, other numbers of passengers may be accommodated in differing embodiments of the present invention.

In some aspects, all or a portion of the wing mounted rotors may be adapted to be used in a forward flight configuration, while other wing mounted rotors may be adapted to be fully stowed during regular, forward, flight. The aerial vehicle 200 may have two rotors on the right wing 203 and two rotors on the left wing 202. The inboard rotor assemblies on each wing may have wing mounted rotors 206 that are adapted to flip up into a deployed position for vertical take-off and landing, to be moved back towards a stowed position during transition to forward flight, and then may have their blades stowed, and nested, during forward flight. The outboard rotor assembly 207 may pivot in unison from a horizontal to a vertical thrust configuration. The wing mounted rotors 206 may be deployed with a deployment mechanism which not only deploys the propeller from a forward facing to a vertical facing orientation, but also raises the rotor in the deployed position such that the propeller clears the top of the nacelle and the wing even with the propeller blades in a high pitch angle position, as discussed further below.

Similarly, each rear stabilizer 204 may be have rotor units mounted to it, both of which are adapted to be used during vertical take-off and landing, and transition, modes. In some aspects, all of the rotor designs are the same, with a subset used with their main blades for forward flight. In some aspects, all of the rotor designs are the same, with all rotors used for forward flight. In some aspects, there may be a different number of rotor units mounted to the rear stabilizer 204.

In some embodiments, the electric motors of the aerial vehicle are powered by rechargeable batteries. The use of multiple batteries driving one or more power busses enhances reliability, in the case of a single battery failure. In some embodiments, the batteries may be spread out along the rotating portion, and there may be one battery for each of the motor/ducted fan assemblies. In some embodiments, the battery or batteries may reside in part or fully within the aircraft body, with power routed out to the motors through the rotational couplings. In some embodiments, the batteries reside within the vehicle body on a rack with adjustable position such that the vehicle balance may be adjusted depending upon the weight of the pilot. In some aspects, the electric motors of the aerial vehicle are powered by hydrogen powered fuel cells.

Figure 2:
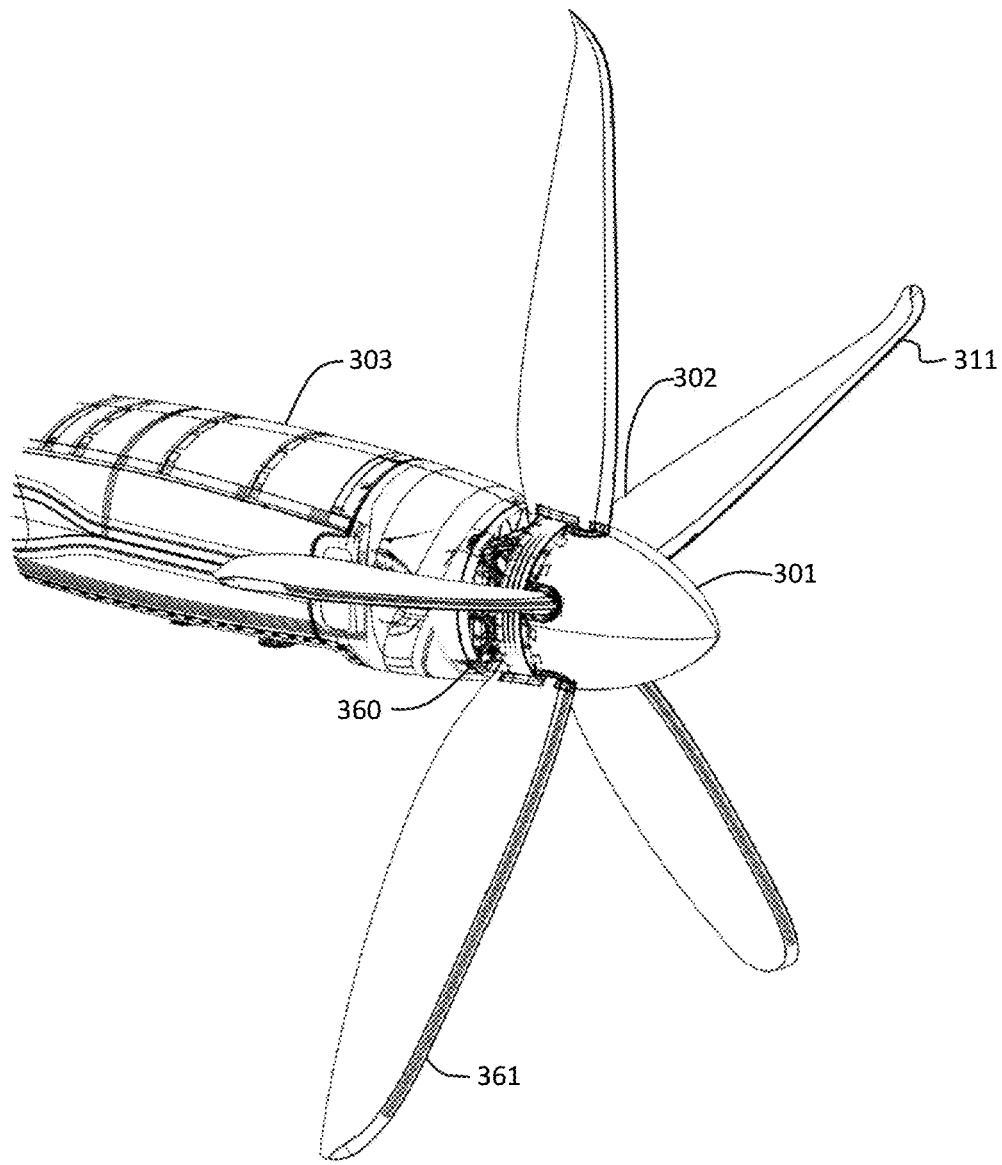
FIG. 2 is a view of a nacelle and rotor according to some embodiments of the present invention.

FIG. 2 illustrates, in partial view, a nacelle 303 which provides aerodynamic cover for a support structure for a motor driven rotor assembly according to some embodiments of the present invention, which may be the mid-wing mounted rotor assembly 206. A spinner, or cowling, 301 is mounted forward of the rotor 302. The rotor assembly is coupled to the nacelle, or internal structure within the nacelle, through a rotor assembly deployment mechanism. A propeller 311 has blades 361 which are coupled to the propeller hub. The propeller hub is coupled to the motor rotor of the electric motor.

Figure 3A:
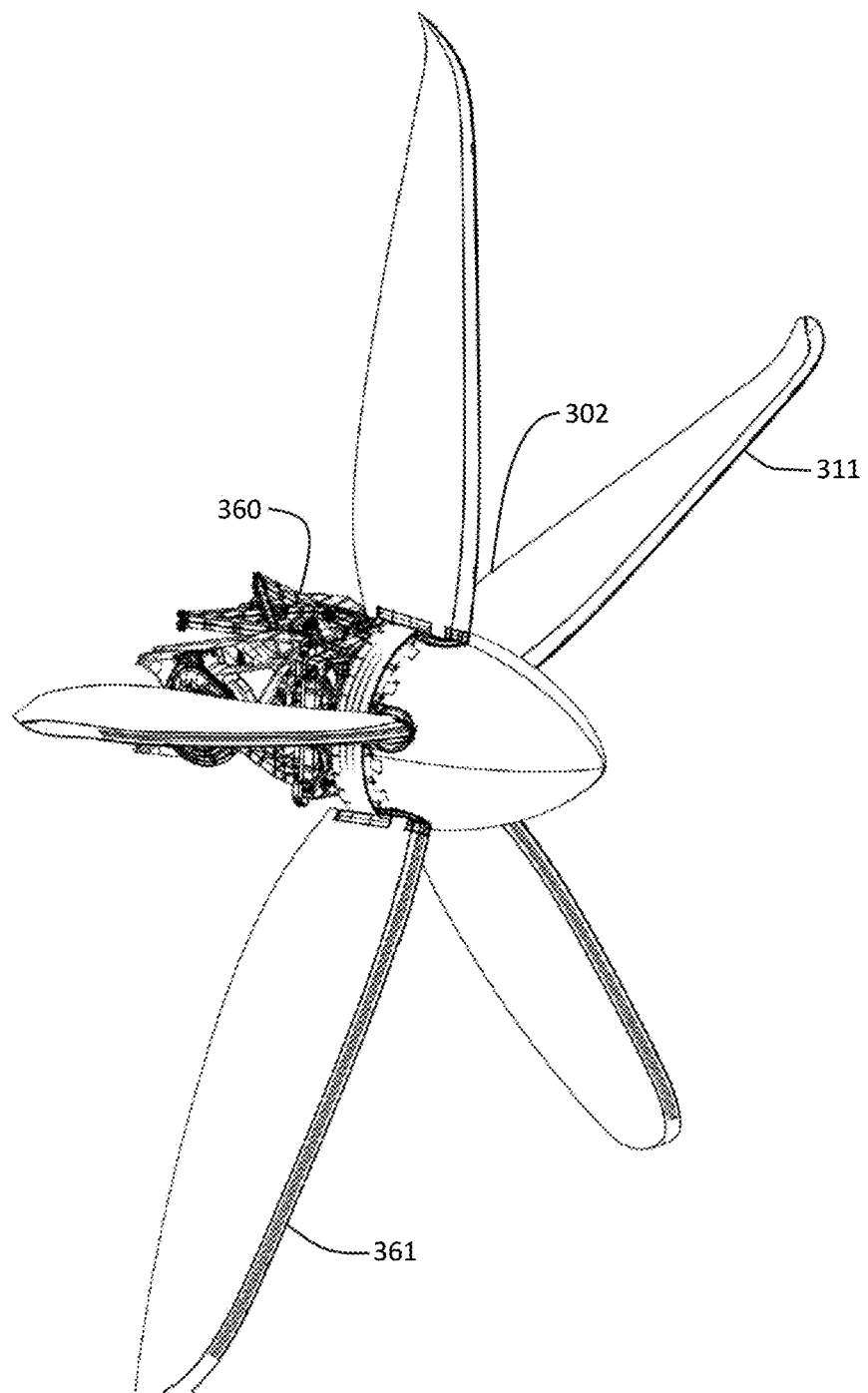
FIGS. 3A-B are partial cutaway views of a nacelle, rotor, and deployment mechanism according to some embodiments of the present invention.
Figure 3B:
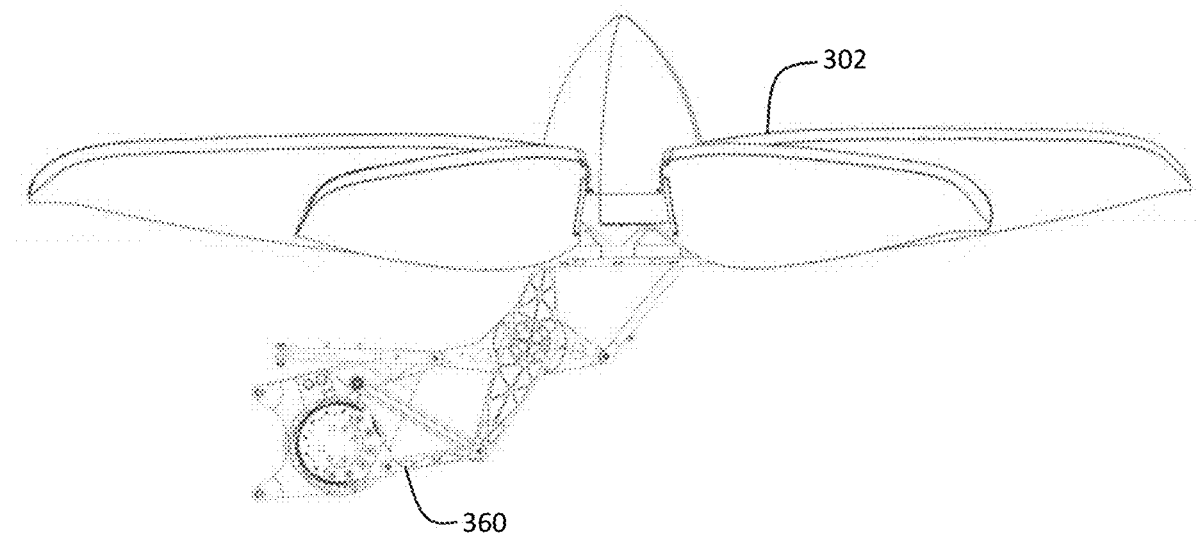

FIGS. 3A and 3B illustrate a rotor assembly deployment mechanism 360, removed from the aircraft and the nacelle for clarity of observation, in a stowed a and deployed configuration, respectively. The rotor 302 supports a propeller 311 with blades 361. In this illustrative embodiment, the propeller 311 has five blades 361.

Figure 4A:
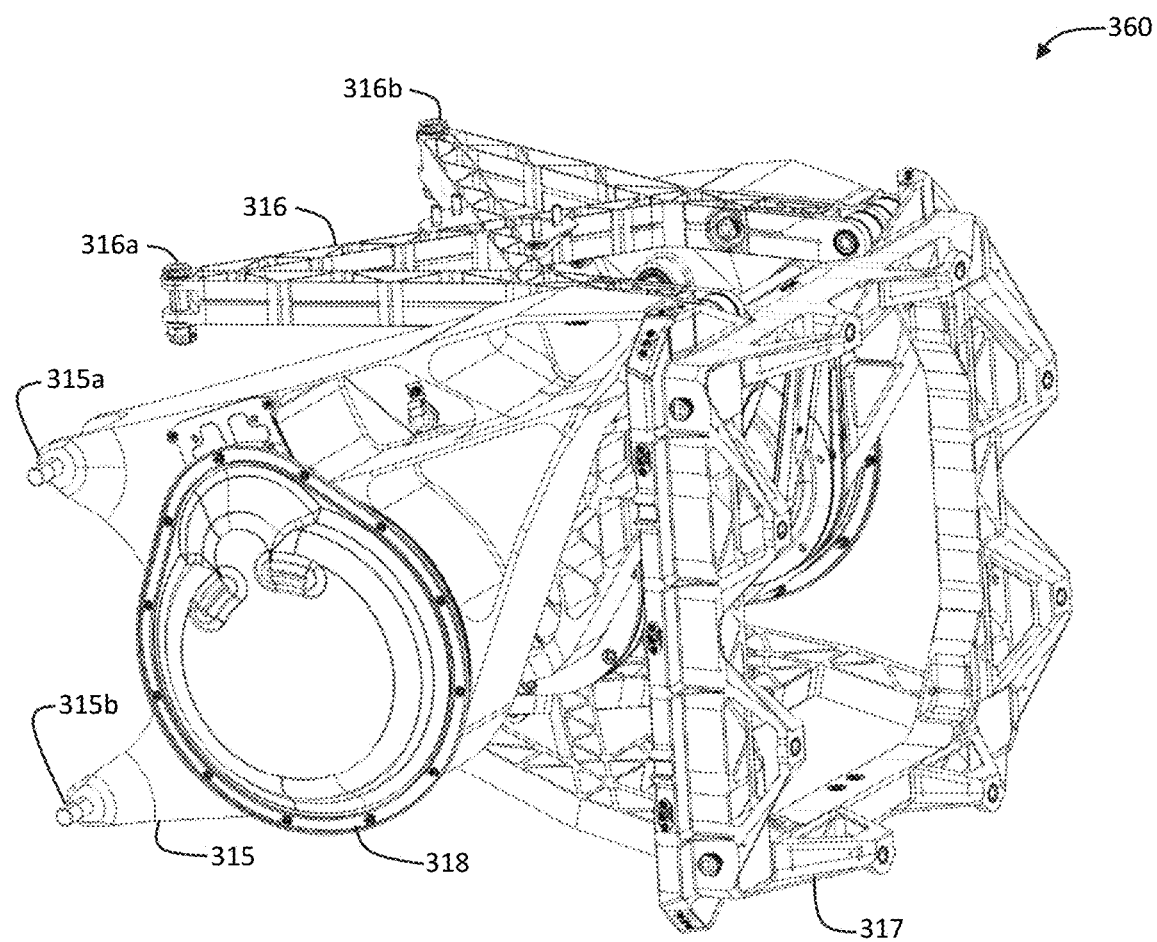
FIGS. 4A-C are views of a rotor assembly deployment mechanism in a stowed configuration according to some embodiments of the present invention.
Figure 4B:
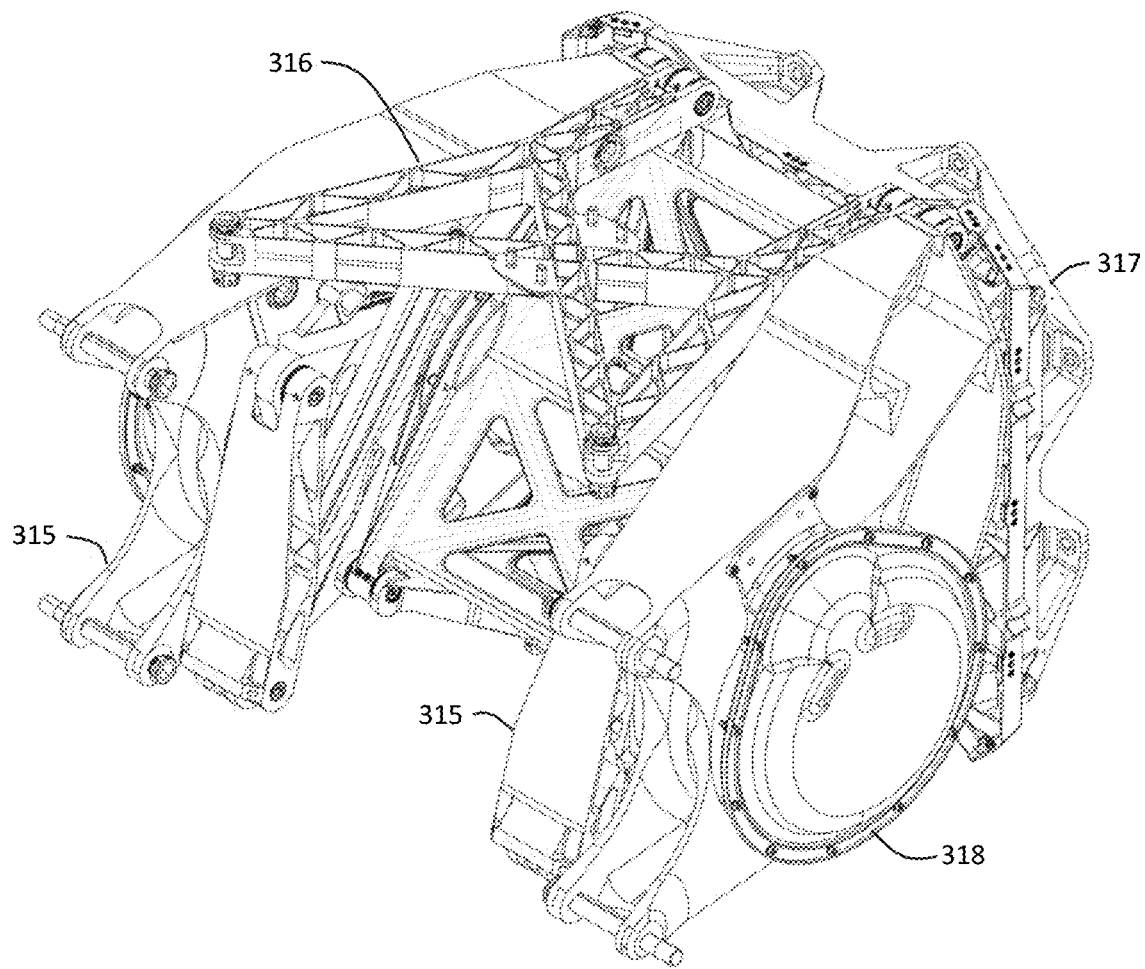
Figure 4C:
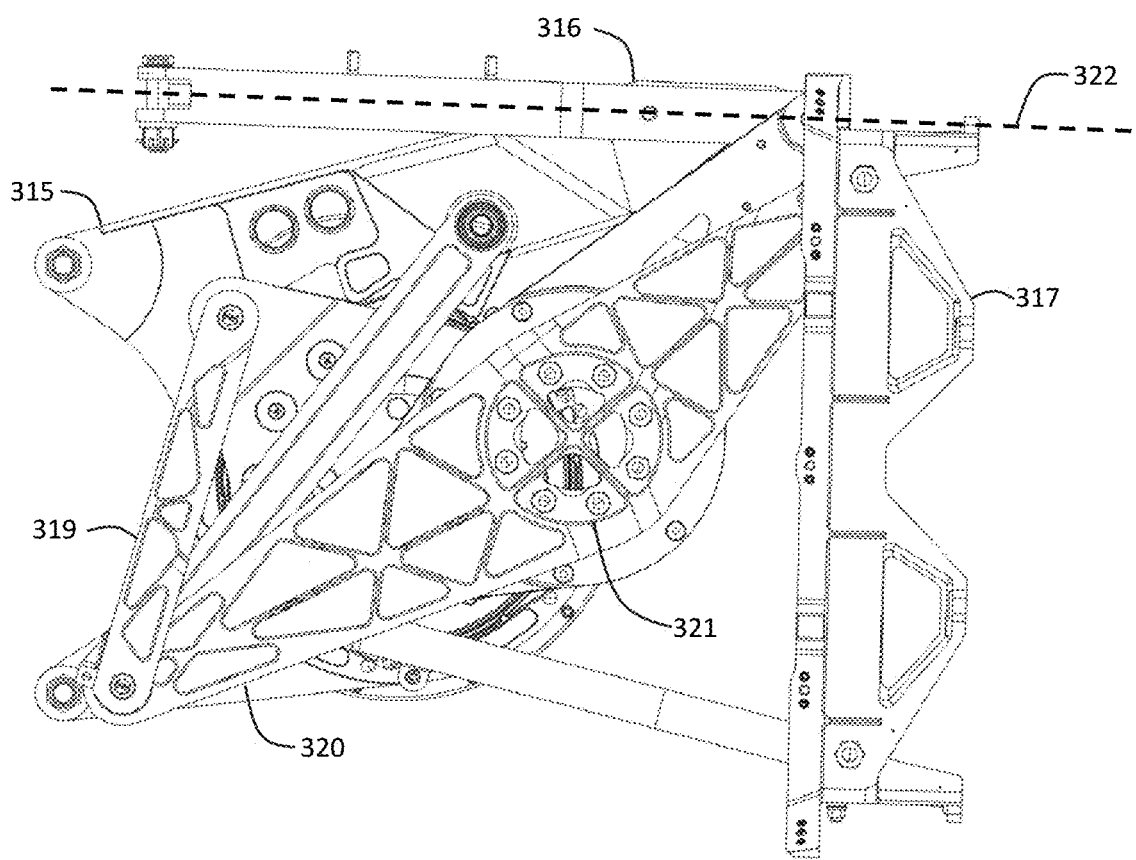

FIGS. 4A, 4B, and 4C illustrate a rotor assembly deployment mechanism 360 in a stowed configuration according to some embodiments of the present invention in a side front, a side rear, and a partially cutaway view, respectively. The rotor assembly deployment mechanism 360 may be fixedly mounted into an aircraft with two main mounting brackets 315 and a top mounting bracket 316. The main mounting brackets 315 have an upper mounting point 315a and a lower mounting bracket 315b. The top mounting bracket 316 has mounting points 316a, 316b. In some aspects, the main bracket mounting points 315a, 315b and the top mounting brackets 316a, 316b provide fixed structural attachments for the rotor assembly deployment mechanism 360 which may be to structural attach points within the wing, and may be within the area covered by the outer surface of the nacelle.

The outboard mounting bracket 317 provides structural support for the rotor assembly, and may have a plurality of attach points on an outboard surface of the mounting bracket 317. In some aspects, the mounting points on the outboard surface of the outboard mounting bracket 317 may define a plane, which may be referred to as the mounting plane of the outboard mounting bracket. The main mounting brackets may have rotary actuators 318 which are fixedly mounted to the main mounting brackets. In some aspects, the rotary actuators may be very low profile actuators utilizing harmonic drive units with the drive motor residing within the harmonic drive cup, for example. FIG. 4C illustrates a top plane 322 which runs through the top mounting bracket 316. In some aspects, the top mounting bracket 316 and the top bracket plane 322 are not horizontal when the rotor assembly deployment mechanism 360 is mounted into a representative aircraft, but are slightly downward tilted, a direction which may follow the geometry of the nacelle, for example. As can be seen, in the stowed configuration the outboard mounting bracket 317 is almost entirely below the top bracket plane. Also, the mounting bracket 317 is retracted such that the outboard mounting bracket 317 overlaps or nearly overlaps with the top bracket 316 with regard to its fore-aft position.

The rotary actuators 318 may have a drive tab pivotally coupled to a first drive link 319 on a first end. The first drive link 319 may be pivotally coupled to a first end of a main drive link 320 on a second end. The main drive link 320 is pivotally coupled to the outboard mounting bracket 317 on a second end. As is illustrated in the Figures, there is a rotary actuator, a first drive link, and a main drive link on each side of the mechanism 360. In a middle portion of the main drive links 320 is an expanded pivot 321.

Figure 5A:
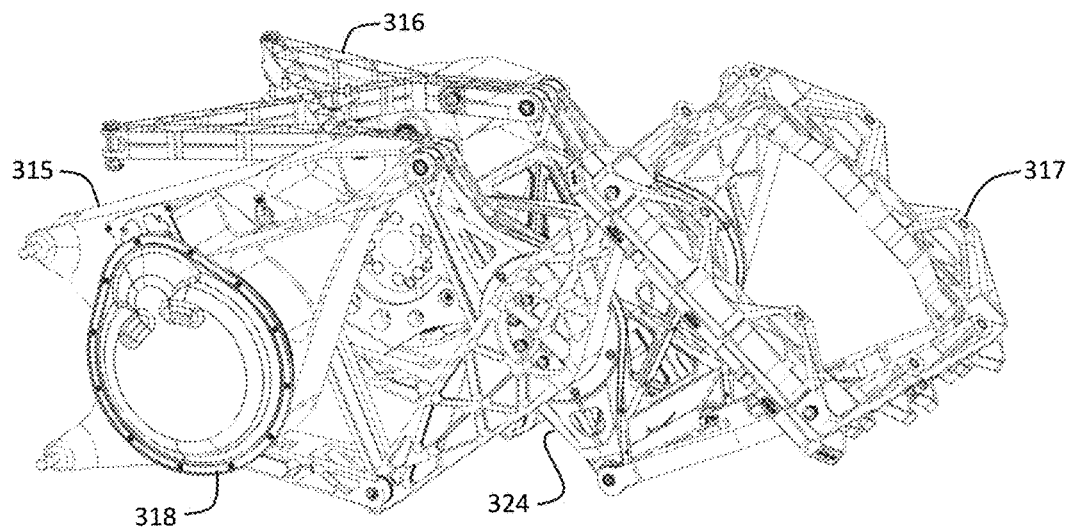
FIGS. 5A-C are views of a rotor assembly deployment mechanism in a partially deployed configuration according to some embodiments of the present invention.
Figure 5B:
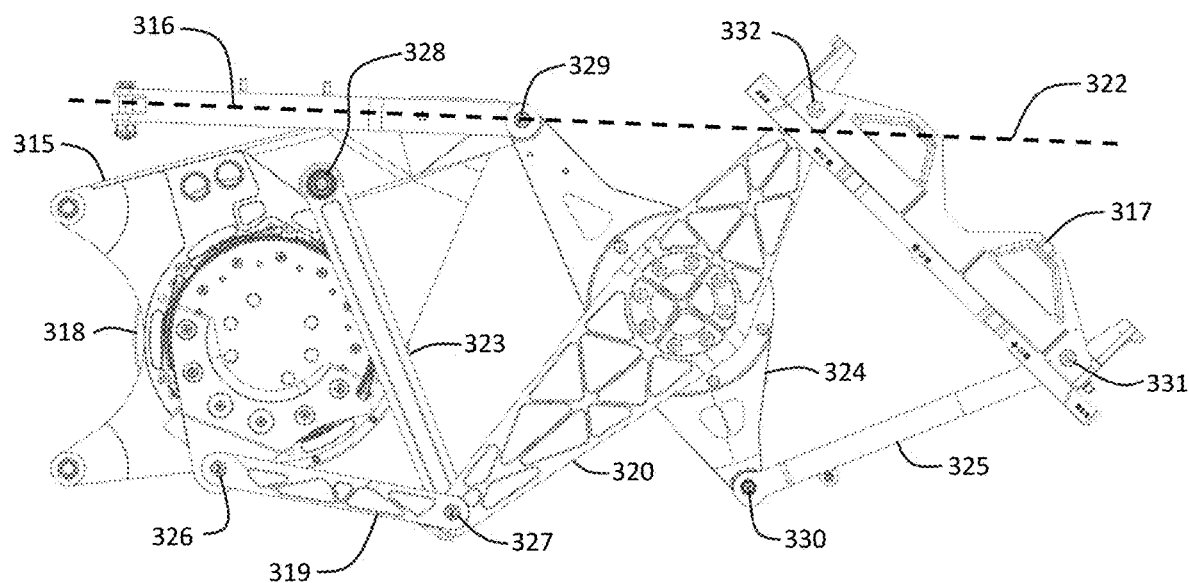
Figure 5C:
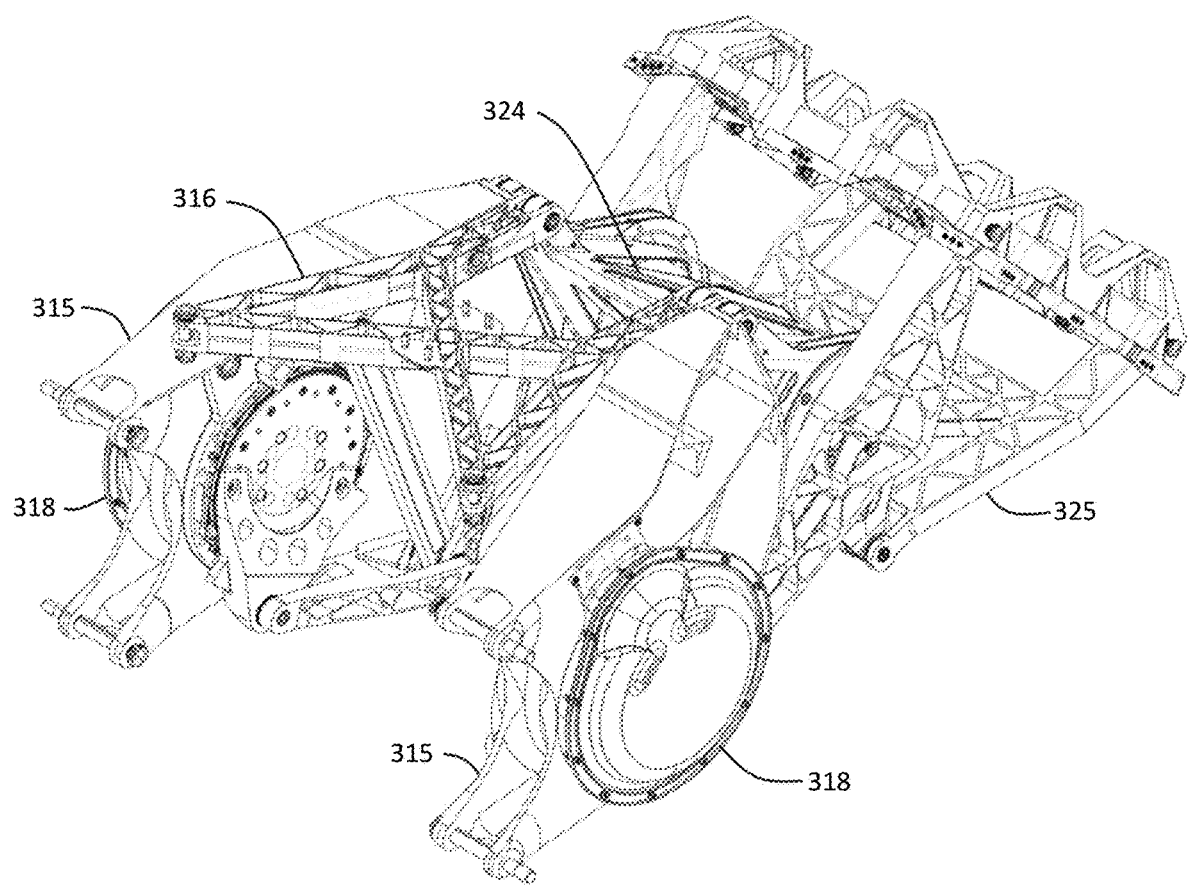

FIGS. 5A, 5B, and 5C illustrate a rotor assembly deployment mechanism 360 in a partially deployed configuration according to some embodiments of the present invention in a side front, a partially cutaway view, and a side rear view, respectively. The rotor assembly deployment mechanism 360 fixedly mounted into an aircraft with two main mounting brackets 315 and a top mounting bracket 316. A first idler link 323 is pivotally coupled 328 to the main mounting bracket 315 on a first end. The second end of the first idler link 323 is pivotally coupled 327 to the pivot which couples the first drive link 319 and the main drive link 320. A main idler box 324 is pivotally coupled 329 to a coupled position of the main mounting bracket 315 and the top mounting bracket 316. The main idler box 324 is pivotally coupled at a middle portion to the main drive link 320 at the expanded pivot 321. The second end of the main idler box 324 is pivotally coupled 330 to the outboard idler box 325. The outboard idler box 325 is pivotally coupled 331 to the outboard mounting bracket 317. As can be seen in FIG. 5A, for example, whereas the main mounting brackets 315 and the first and main drive links are seen on both sides of the mechanism, the main idler box 324 and the outboard idler box 325 are continuous structures which run side to side. The main idler box 324 includes raised structure, in order to accommodate the expanded pivot 321. These structures then provide significant stiffness, which may be required when deploying powered rotors during flight operations. In some aspects, the ratio of the diameter of the bearings supporting the expanded pivot 321 to the distance between the bearings across the main idler box 324 is greater than 0.2; in some aspects the ratio is greater than 0.25; in some aspects the ratio is greater than 0.3; in some aspects the ratio is greater than 0.35.

As can be seen in FIG. 5B, in this partially deployed configuration, the mounting bracket 317 has now moved significantly forward from the top mounting bracket 316, as well as beginning to move upwards through the top plane 322.

Figure 6A:
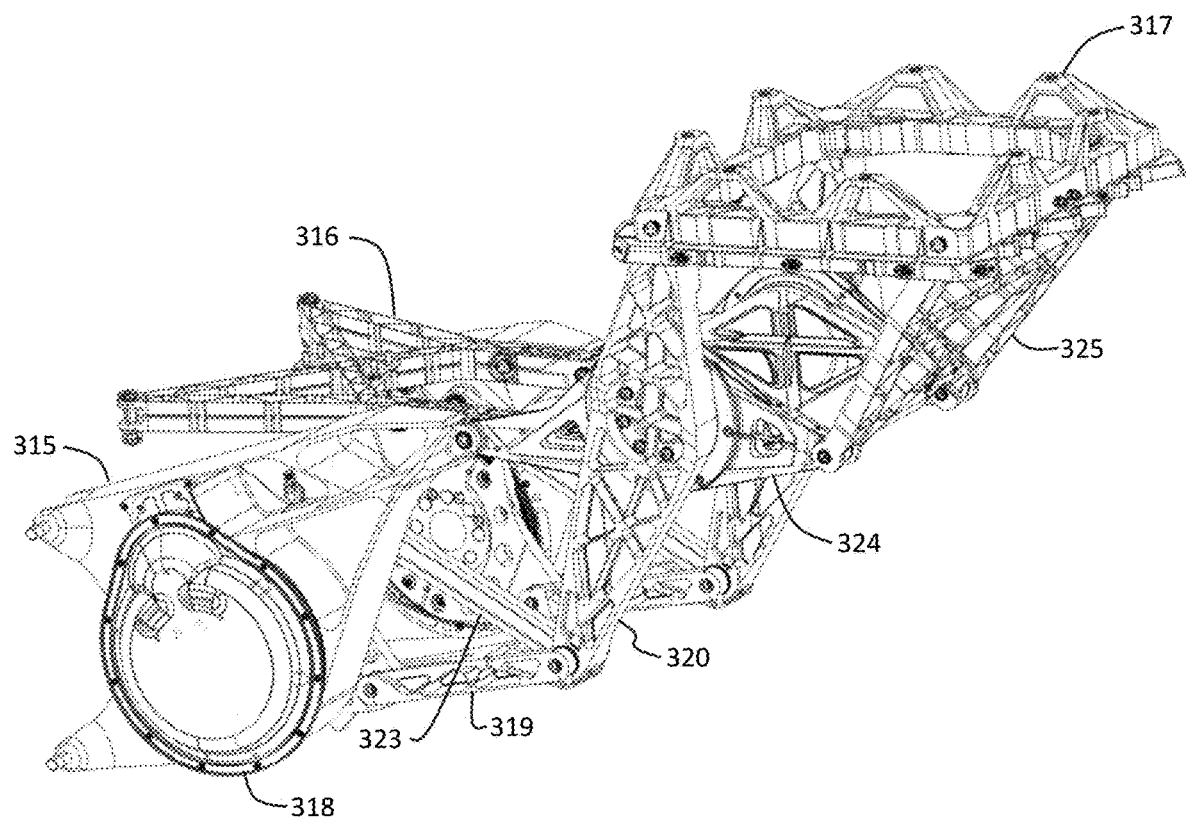
FIGS. 6A-C are views of a rotor assembly deployment mechanism in a deployed configuration according to some embodiments of the present invention.
Figure 6B:
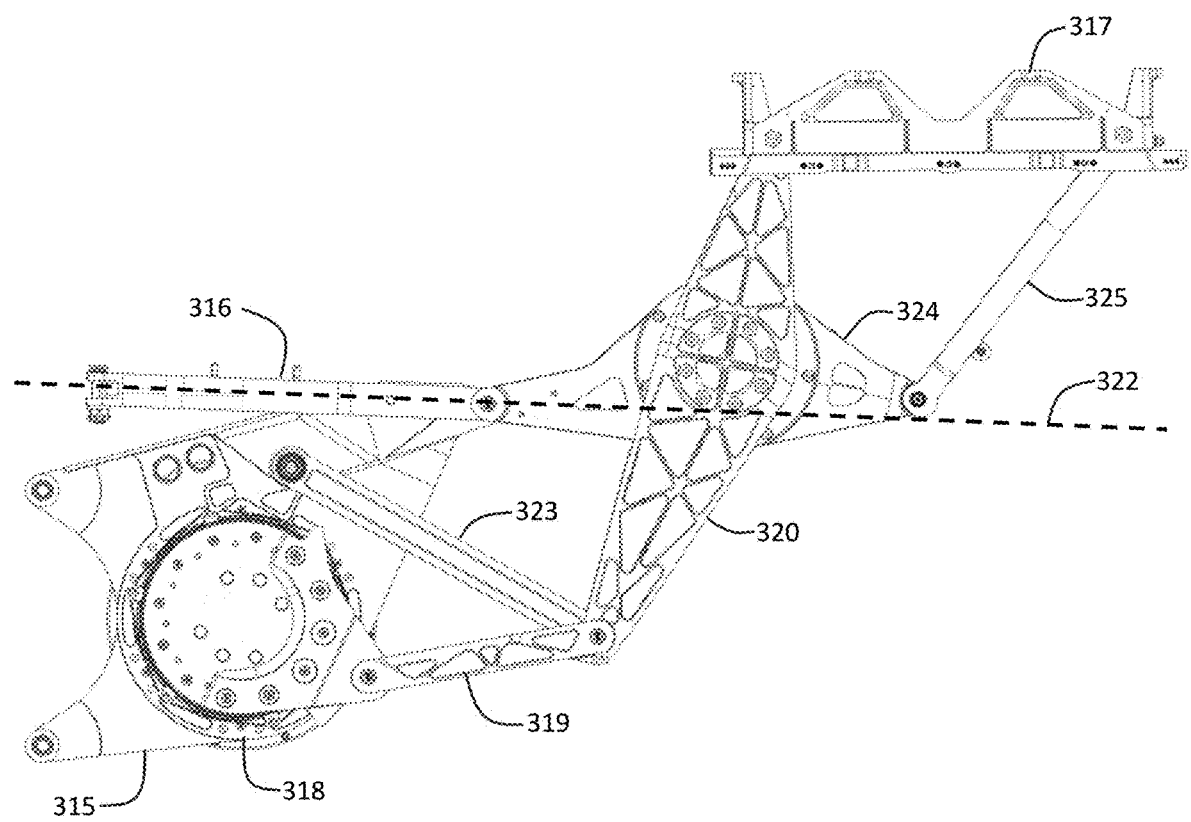
Figure 6C:
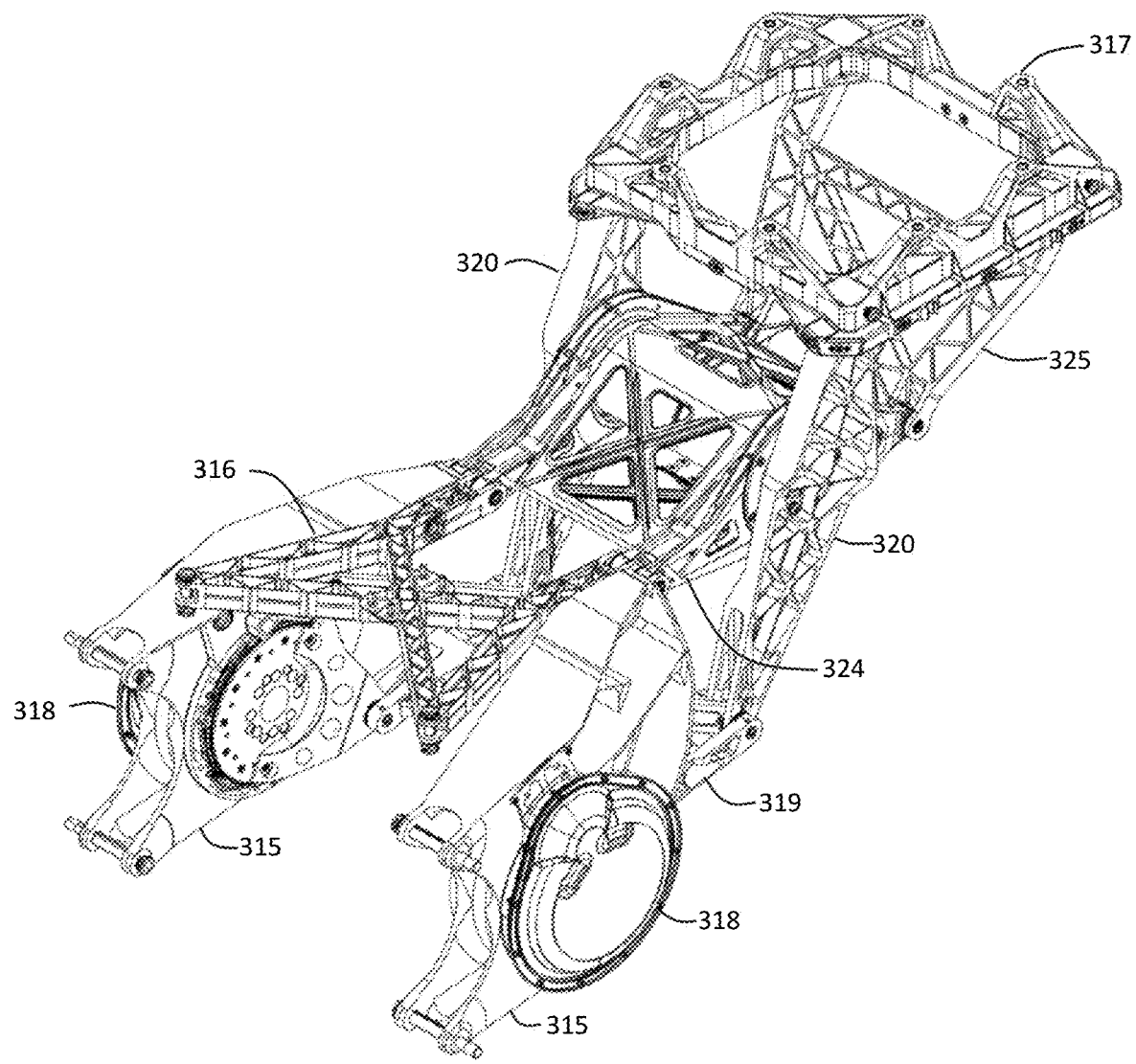

FIGS. 6A, 6B, and 6C illustrate a rotor assembly deployment mechanism 360 in a fully deployed configuration according to some embodiments of the present invention in a side front, a partially cutaway view, and a rear side view, respectively. The rotor assembly deployment mechanism 360 is fixedly mounted into an aircraft with two main mounting brackets 315 and a top mounting bracket 316. As can be seen in FIG. 6B, the outboard mounting bracket 317 is now fully above the top plane 322, which would place the propellers of a rotor assembly forward of a wing to which the rotor assembly is mounted, and also above said wing. The raised position of the deployed mounting bracket 317 may allow a rotor assembly mounted on the mounting bracket to reside in a deployed position where the propeller blades may clear the top of the nacelle and the wings even when the propeller blades are in a highly pitched blade pitch angle position.

Figure 7:
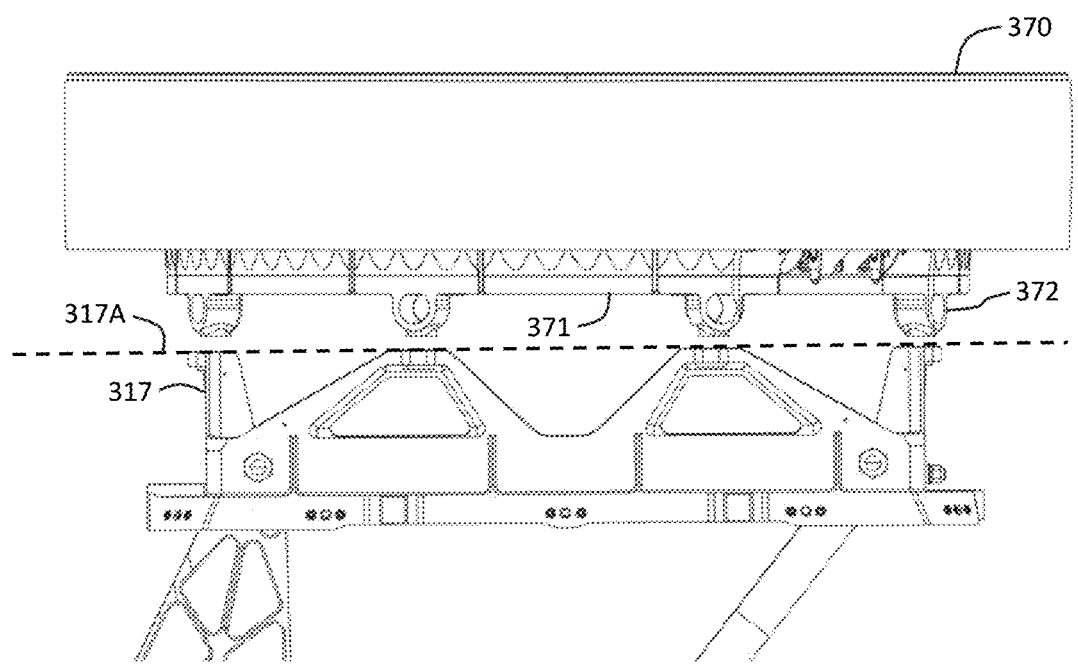
FIG. 7 is a side view of a mounting bracket with motor according to some embodiments of the present invention.

In some embodiments of the present invention, as seen in partial view in FIG. 7, the outboard mounting bracket 317 supports a motor stator 371 at a mounting plane 317A. The attach points 372 appear suspended over the outboard mounting bracket as some intermediate mounting supports are omitted in this view. An outboard motor rotor 370 is rotationally coupled to the motor stator 371. The motor rotor 370 is fixedly coupled to the propeller hub.

Figure 8:
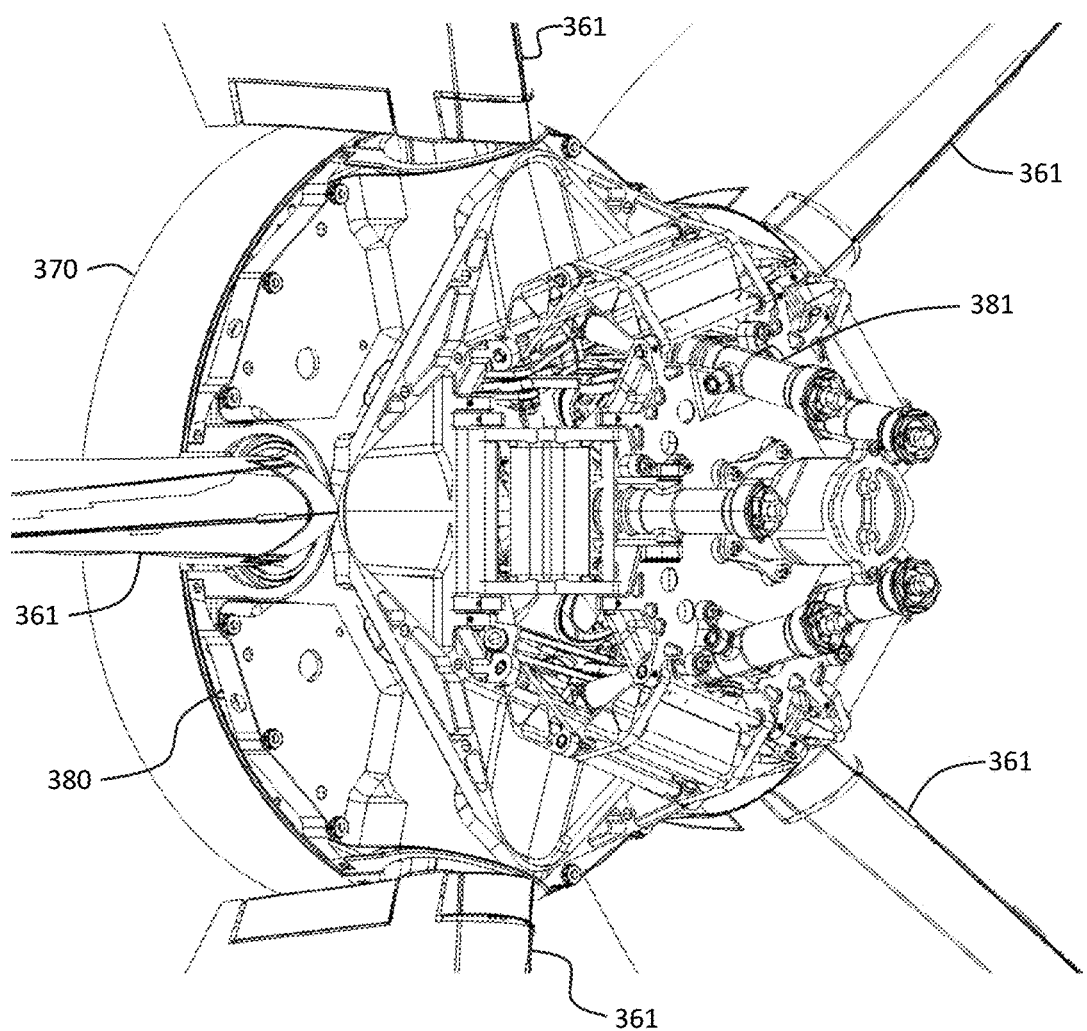
FIG. 8 is partial view of a rotor assembly according to some embodiments of the present invention.

FIG. 8 illustrates portions of a rotor assembly as they may be mounted onto a motor rotor 370. The propeller hub 380 may support a propeller blade pitch control mechanism 381, which is configured to control the blade pitch of the propeller blades 361. In some embodiments of the present invention, the propeller blades may have fixed pitch angles.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A rotor assembly deployment mechanism, said deployment mechanism comprising:
   a first main mounting bracket;
   a first rotary actuator fixedly mounted to said first main mounting bracket;
   a second main mounting bracket;
   a second rotary actuator fixedly mounted to said second main mounting bracket;
   a top mounting bracket, said top mounting bracket coupled to an upper forward portion of said first main mounting bracket at a first location; said top mounting bracket coupled to an upper forward portion of said second main mounting bracket at a second location;
   a main idler box pivotally coupled to said first main mounting bracket and said second main mounting bracket;
   a first drive link pivotally coupled to an output of said first rotary actuator at a first end of said first drive link;
   a second drive link pivotally coupled to an output of said second rotary actuator at a first end of said second drive link;
   a first main drive link pivotally coupled to a second end of said first drive link;
   a second main drive link pivotally coupled to a second end of said second drive link;
   wherein said first main drive link and said second main drive link are pivotally coupled to said main idler box at an intermediate portion of said first main drive link and said second main drive link and said main idler box;
   an outboard idler box, said outboard idler box pivotally coupled to a second end of said main idler box at a first end of said outboard idler box; and
   an outboard mounting bracket, said outboard mounting bracket pivotally coupled to a second end of said outboard idler box and to a second end of said first main drive link and said second main drive link.

2. The rotor assembly deployment mechanism of claim 1 wherein said top mounting bracket defines a top mounting bracket plane, and wherein said outboard mounting bracket is configured to deploy from a stowed position predominantly below said top mounting bracket plane to a deployed position predominantly above said top mounting bracket plane.

3. The rotor assembly deployment mechanism of claim 1 wherein said top mounting bracket defines a top mounting bracket plane, and wherein said outboard mounting bracket is configured to deploy from a stowed position predominantly below said top mounting bracket plane to a deployed position completely above said top mounting bracket plane.

4. The rotor assembly deployment mechanism of claim 1 wherein said outboard mounting bracket is configured to deploy from a stowed position to a deployed position wherein all of said outboard mounting bracket is higher in the deployed position than the position of the any of said outboard mounting bracket in the stowed position.

5. The rotor assembly deployment mechanism of claim 2 wherein said outboard mounting bracket is configured to deploy from a stowed position to a deployed position wherein all of said outboard mounting bracket is higher in the deployed position than the position of the any of said outboard mounting bracket in the stowed position.

6. The rotor assembly deployment mechanism of claim 3 wherein said outboard mounting bracket is configured to deploy from a stowed position to a deployed position wherein all of said outboard mounting bracket is higher in the deployed position than the position of the any of said outboard mounting bracket in the stowed position.

7. The rotor assembly deployment mechanism of claim 1 wherein said first main drive link is pivotally coupled to said main idler box with a bearing of a first diameter, and wherein said second main drive link is pivotally coupled to said main idler box with a bearing of said first diameter, and wherein said first drive link and said second main drive link are separated by a minimum distance of a first distance, and wherein the ration of said first diameter to said first distance is greater than 0.2.

8. The rotor assembly deployment mechanism of claim 2 wherein said first main drive link is pivotally coupled to said main idler box with a bearing of a first diameter, and wherein said second main drive link is pivotally coupled to said main idler box with a bearing of said first diameter, and wherein said first drive link and said second main drive link are separated by a minimum distance of a first distance, and wherein the ration of said first diameter to said first distance is greater than 0.2.

9. The rotor assembly deployment mechanism of claim 5 wherein said first main drive link is pivotally coupled to said main idler box with a bearing of a first diameter, and wherein said second main drive link is pivotally coupled to said main idler box with a bearing of said first diameter, and wherein said first drive link and said second main drive link are separated by a minimum distance of a first distance, and wherein the ration of said first diameter to said first distance is greater than 0.2.

10. The rotor assembly deployment mechanism of claim 6 wherein said first main drive link is pivotally coupled to said main idler box with a bearing of a first diameter, and wherein said second main drive link is pivotally coupled to said main idler box with a bearing of said first diameter, and wherein said first drive link and said second main drive link are separated by a minimum distance of a first distance, and wherein the ration of said first diameter to said first distance is greater than 0.2.

11. The rotor assembly deployment mechanism of claim 1 wherein said first main drive link is pivotally coupled to said main idler box with a bearing of a first diameter, and wherein said second main drive link is pivotally coupled to said main idler box with a bearing of said first diameter, and wherein said first drive link and said second main drive link are separated by a minimum distance of a first distance, and wherein the ration of said first diameter to said first distance is greater than 0.3.

12. The rotor assembly deployment mechanism of claim 2 wherein said first main drive link is pivotally coupled to said main idler box with a bearing of a first diameter, and wherein said second main drive link is pivotally coupled to said main idler box with a bearing of said first diameter, and wherein said first drive link and said second main drive link are separated by a minimum distance of a first distance, and wherein the ration of said first diameter to said first distance is greater than 0.3.

13. The rotor assembly deployment mechanism of claim 5 wherein said first main drive link is pivotally coupled to said main idler box with a bearing of a first diameter, and wherein said second main drive link is pivotally coupled to said main idler box with a bearing of said first diameter, and wherein said first drive link and said second main drive link are separated by a minimum distance of a first distance, and wherein the ration of said first diameter to said first distance is greater than 0.3.

14. The rotor assembly deployment mechanism of claim 6 wherein said first main drive link is pivotally coupled to said main idler box with a bearing of a first diameter, and wherein said second main drive link is pivotally coupled to said main idler box with a bearing of said first diameter, and wherein said first drive link and said second main drive link are separated by a minimum distance of a first distance, and wherein the ration of said first diameter to said first distance is greater than 0.3.

15. The rotor assembly deployment mechanism of claim 1 wherein said first rotary actuator and said second rotary actuator are low profile actuators comprising a harmonic drive and a drive motor, and wherein said drive motor resides within the cup of said harmonic drive.

16. The rotor assembly deployment mechanism of claim 2 wherein said first rotary actuator and said second rotary actuator are low profile actuators comprising a harmonic drive and a drive motor, and wherein said drive motor resides within the cup of said harmonic drive.

17. The rotor assembly deployment mechanism of claim 5 wherein said first rotary actuator and said second rotary actuator are low profile actuators comprising a harmonic drive and a drive motor, and wherein said drive motor resides within the cup of said harmonic drive.

18. The rotor assembly deployment mechanism of claim 6 wherein said first rotary actuator and said second rotary actuator are low profile actuators comprising a harmonic drive and a drive motor, and wherein said drive motor resides within the cup of said harmonic drive.

* * * * *